July 7, 1953 R. E. McLEAN 2,644,228
ROTARY DRIVE WHEEL TYPE CAN OPENER
Filed June 16, 1948 5 Sheets-Sheet 1
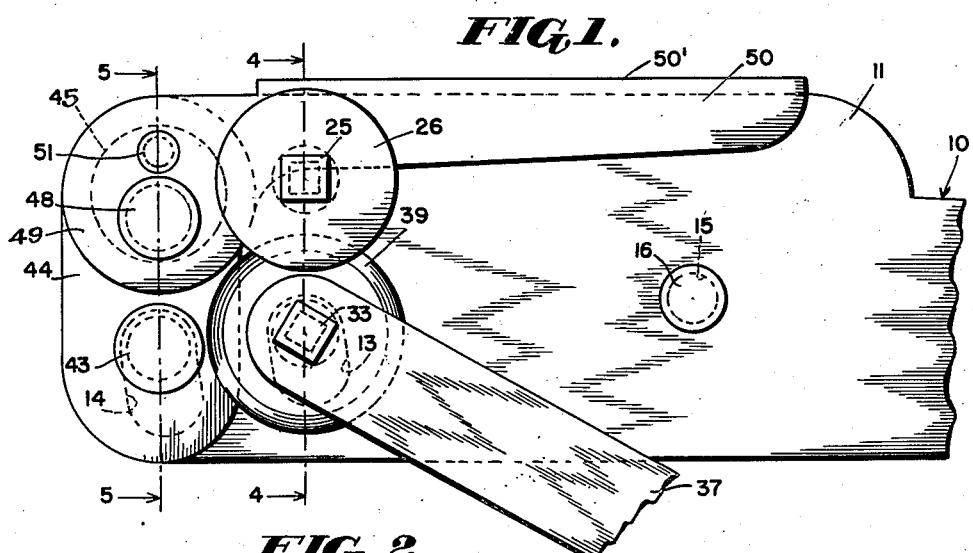
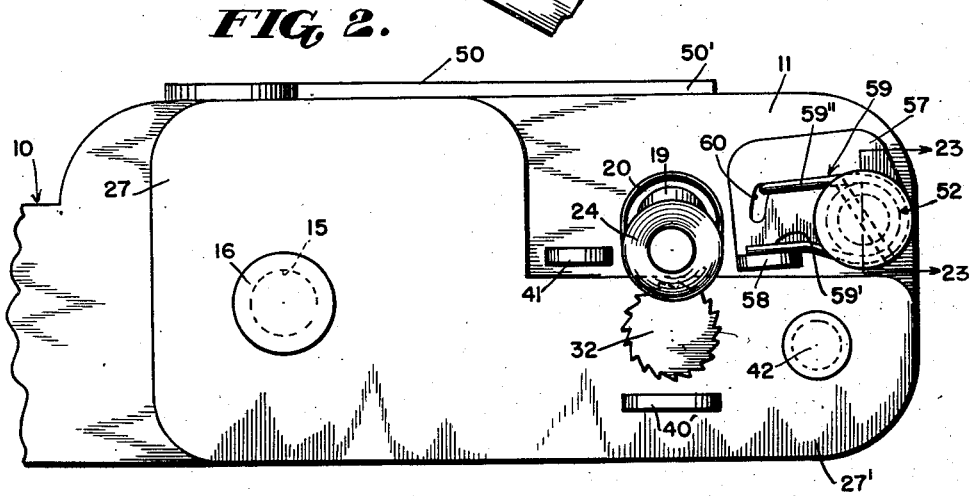
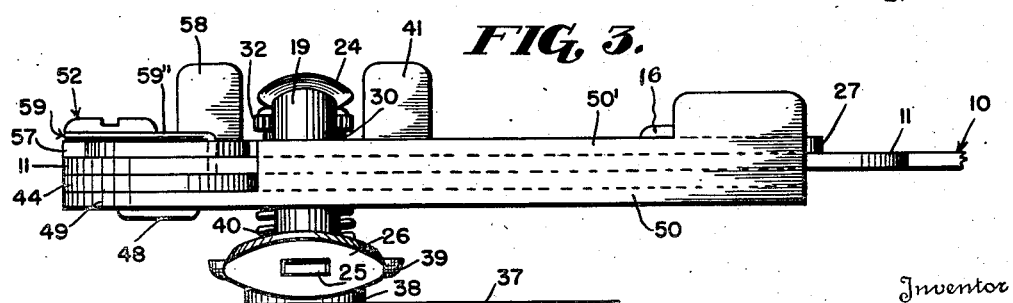
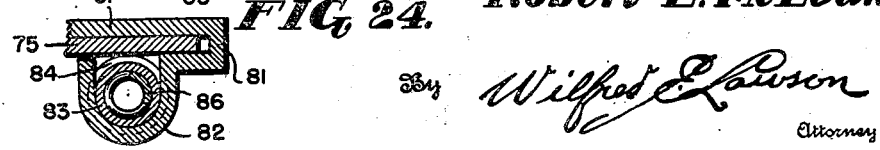
Inventor
Robert E. McLean
By Wilfred E. Lawson
Attorney July 7, 1953  R. E. McLEAN  2,644,228
ROTARY DRIVE WHEEL TYPE CAN OPENER
Filed June 16, 1948  5 Sheets-Sheet 2

Inventor
Robert E. McLean
By Wilfred E. Lawson
Attorney

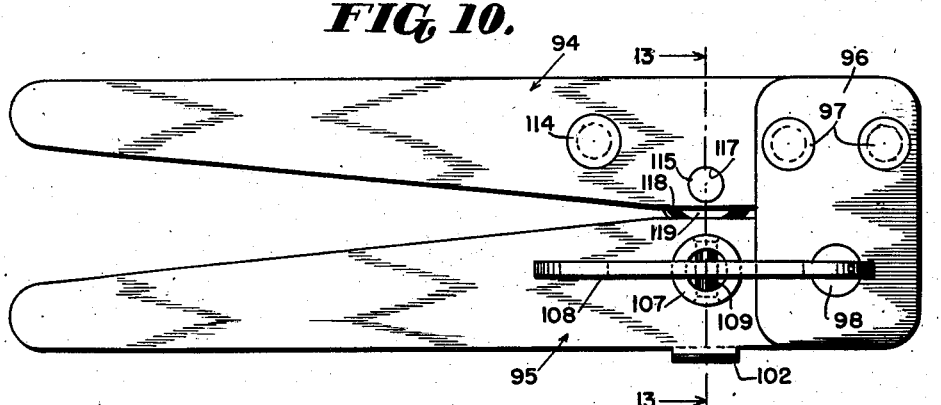

July 7, 1953 R. E. McLEAN 2,644,228
ROTARY DRIVE WHEEL TYPE CAN OPENER
Filed June 16, 1948 5 Sheets-Sheet 4

Inventor
Robert E. McLean
By Wilfred Lawson
Attorney

July 7, 1953
R. E. McLEAN
2,644,228
ROTARY DRIVE WHEEL TYPE CAN OPENER
Filed June 16, 1948
5 Sheets-Sheet 5
FIG. 18.
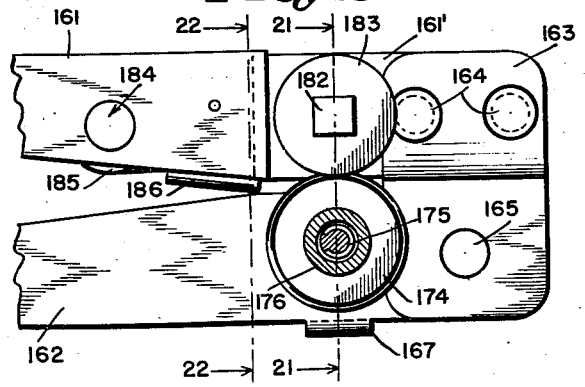
FIG. 21.
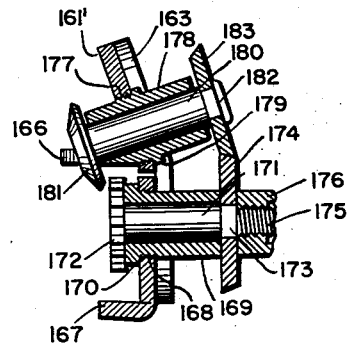
FIG. 19.
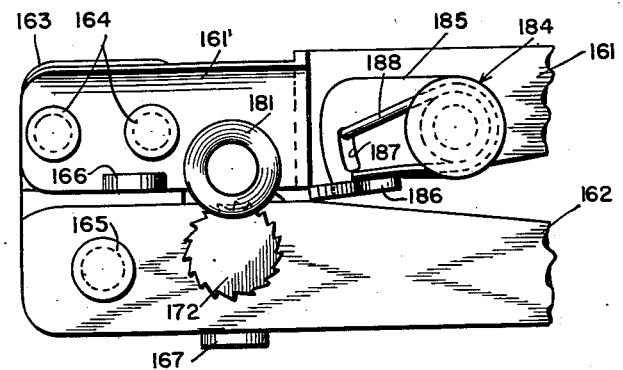
FIG. 22.
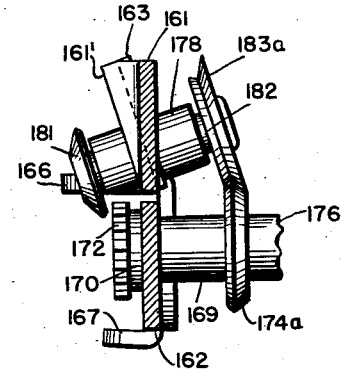
FIG. 25.
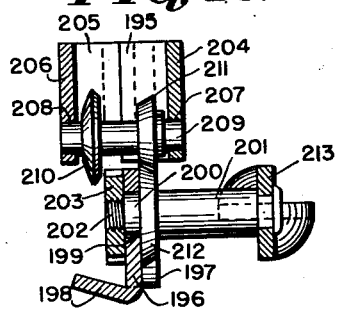
FIG. 20.
Inventor
Robert E. McLean
By Wilfred E. Lawson
Attorney Patented July 7, 1953

2,644,228

UNITED STATES PATENT OFFICE 2,644,228

ROTARY DRIVE WHEEL TYPE CAN OPENER

Robert E. McLean, Columbus, Ga., assignor to John C. Hockery, Kansas City, Mo., as trustee Application June 16, 1948, Serial No. 33,280

19 Claims. (Cl. 30—9)

This invention relates generally to the class of can openers and is directed particularly to improvements in can openers of the rotary drive wheel type, wherein is employed a rotatable wheel which engages the under side of the can rim flange to rotate the can against a cutter.

The present invention has for a principal object to provide a rotary drive wheel type can opener having improvements in operative connections between the shaft of the can rim engaging driving wheel and the shaft supporting a cutter of the disc type whereby desired movement is transmitted from one shaft to the other.

The novel and improved features of the present invention are based upon and constitute improvements over the features of the cooperating can feed or driving wheel and disc cutter illustrated and described in my co-pending application Serial No. 728,063, filed February 12, 1947, now Patent No. 2,592,934.

Another object of the invention is to provide a can opener of the rotary drive wheel type wherein cooperating cones operatively coupled with the driving wheel and rotary cutter disc are brought into operative, driving connection upon the movement of the driving wheel toward the cutter disc whereby rotational movement is imparted from the shaft of the driving wheel to the shaft of the cutter disc.

Still another object of the invention is to provide a can opener of the rotary drive wheel type having cooperating cone members between the can rim engaging driving wheel and the rotary cutter disc which, when brought into operative connection one with the other not only function to impart rotational movement to the cutter disc but function to effect axial movement of the cutter disc.

A still further object of the invention is to provide a can opener of the rotary drive wheel type wherein a novel association of the cutting edge of the cutter disc and a side face of the drive wheel is brought about upon movement of the can rim engaging driving wheel into working position with respect to the rotary cutter disc and the side wall of the can is gripped between a corner of the disc adjacent to the cutting edge thereof and a side face of the driving wheel.

Still another object of the invention is to provide a construction of a can opener of the character stated in which a pair of holding handles are gripped by the operator to puncture the end of a can and then maintain a cone integral with the disc cutter in frictional engagement with a cone adjacent to the can driving wheel, one of the two said holding handles being secured to a perpendicular plate at a point rearward of the disc cutter and can driving wheel while the other handle is pivoted to the said plate for limited oscillation in relation to the first handle, the point of pivot also being rearward of the disc cutter and can rim engaging driving wheel.

Still another object of the invention is to provide in a can opener of the character stated, an alternate type of friction cone for use with the can rim engaging driving wheel and a cooperating alternate type of cone for use with the rotary disc cutter, each of the two alternate types of cones being double beveled in such a manner that operating engagement of one cone with the other does not decrease the predetermined spacing between the can driving wheel and the disc cutter.

A still further object of the invention is to provide in a can opener of the character stated, an oscillatable can rest for use in association with a fixed can rest positioned rearwardly of the disc cutter, the said oscillatable can rest being positioned forwardly of the disc cutter and provided with novel resilient means normally urging the rest to bear on the rim or flange of a can when engaged in the opener device but limiting oscillation of the rest in the urged direction to a predetermined position.

The invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in elevation of the right hand or outer side of a wall mounted can opener constructed in accordance with one embodiment of the present invention.

Figure 2 is a view in elevation of the opposite or left hand side of the same.

Figure 3 is a view in top plan of the opener.

Figure 10 is a view in elevation of the right hand or outside of a third embodiment of the invention.

Figure 11 is a view in elevation of the left hand side of the third embodiment.

Figure 12 is a view in top plan of the forward end of the third embodiment.

Figure 13 is a vertical transverse section taken substantially on the line 13—13 of Figure 10.

Figure 14 is a view in elevation of the right hand side of the fourth embodiment of the invention.

Figure 18 is a view in elevation of the forward end of the right hand side of a fifth embodiment of the invention, the hub of the operating crank being in section.

Figure 19 is a view in elevation of the left hand side of the fifth embodiment.

Figure 20 is a view in top plan of the forward end of the fifth embodiment.

Figure 21 is a vertical transverse section taken substantially on the line 21—21 of Figure 18.

Figure 22 is a sectional view corresponding to Figure 21 and taken rearwardly of the line 21—21, on the line 22—22 but showing different types of driving cones.

Figure 24 is a detail section taken on line 24—24 of Figure 8.

Figure 25 is a section corresponding to and illustrating a modification of the embodiment illustrated in Figure 13.

Figure 4:
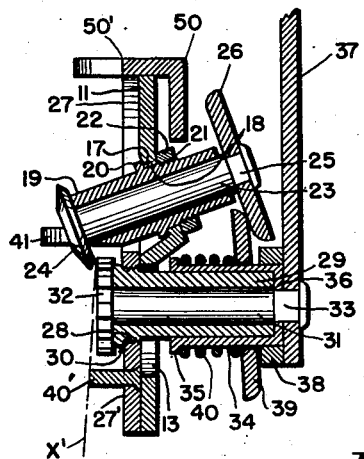
Figure 4 is a vertical transverse section taken substantially on a line 4—4 of Figure 1.

Referring now more particularly to the drawings and more especially to the form of the present invention as illustrated in Figures 1 to 5 inclusive, the numeral 10 generally designates a supporting bracket or arm, the outer end of which is of increased width to provide the plate 11, and is disposed, when the arm is mounted for the use of the opener, with its side faces vertically disposed. This plate 11 is relatively long and adjacent to the forward end thereof and also adjacent to the bottom longitudinal edge is provided an elliptical opening 13 and forwardly of this opening 13 and at a slightly lower elevation, is a second elliptical opening 14. The center from which these openings are struck is at a substantial distance rearwardly and at a slightly higher elevation and forms the center of an opening 15 in the body plate, in which is fixed or mounted a pivot rivet 16, the use of which is hereinafter described.

Above the rear opening 13, the plate 11 is pressed outwardly or to the right, as shown in Figure 4 to provide a portion 17 which is slightly angularly disposed with respect to the adjacent vertical face of the plate and this angled portion is provided with an opening 18 through which is extended a bearing sleeve 19 which carries an integral collar 20 substantially midway between its ends, as shown in Figure 4, which limits the movement of the bearing sleeve through the opening. In spaced relation with this collar the bearing sleeve is externally screw threaded as at 21, to receive the locking nut 22 which bears against the opposite side of the angled or inclined portion 17 of the plate to firmly secure the bearing sleeve in position with approximately one half of its length disposed upon each side of the body plate.

Rotatably mounted in and extending through the bearing sleeve 19 is a cutter disc shaft 23 which has mounted upon the inner or left hand end thereof the cutting disc or wheel 24. The opposite end of this shaft has the reduced squared portion 25 which extends through a similarly formed opening in a cone thrust wheel 26.

As shown the sleeve 19 has an over all length somewhat less than the length of the shaft 23 so that slight axial movement of the shaft 23 in the sleeve is permitted.

The numeral 27 designates an oscillatable can rim engaging drive wheel supporting plate which is mounted, upon the inner or left hand side of the body plate 11, upon the rivet 16. This plate at its back or rear end is of a height substantially equal to the height of the body plate 11 while the forward half of the plate 27 is of substantially half the height of the body plate, and lies against the lower part of the body plate as shown in Figure 2. This narrow or low forward end portion of the drive wheel supporting plate, designated 27' extends across the elliptical openings 13 and 14.

In line with the elliptical opening 13, transversely of the plates 11 and 27, the reduced portion 27' of the drive wheel supporting plate, has a threaded opening 28 therein and through this opening is extended the bearing sleeve 29 which carries at its inner or left hand end a collar 30 which abuts the adjacent face of the portion 27' of the oscillatable wheel supporting plate 27. Adjacent to this collar 30 the bearing sleeve 29 is suitably threaded as shown in Figure 4, for threaded engagement in the opening 28. Thus the bearing sleeve is rigidly secured to the forward portion of the plate 27 and it extends through the elliptical opening 13 and has up and down movement in said opening when the plate 27 is oscillated on its pivot 16.

As will be clearly seen upon reference to Figure 4 the center of the sleeve 29 is directly below the center of the bearing sleeve 19 and extending through the bearing sleeve 29 is the shaft or arbor 31 which carries upon the inner or left hand end, the peripherally toothed can rim engaging driving wheel 32. This wheel 32 is in a vertical plane passing across the inner side of the cutting edge of the disc cutter 24. The outer or right hand end of this arbor is of polygonal cross section as at 33, like the end portion 25 of the arbor 23.

The right hand end of the bearing sleeve 29 is extended into a thimble 34, the inner end of which has the encircling collar 35 while the outer end has the transverse wall 36 which has an opening centrally therein to receive the polygonal portion 33 of the arbor 31. Thus the thimble is connected with the arbor 31 to turn therewith. Also secured to this polygonal portion 33 of the arbor 31 is an end of the operating crank 37, the outer end of which crank, not shown, carries a handle or knob of suitable form to facilitate grasping the crank and rotating the shaft.

Encircling the outer or right hand end of the thimble and positioned against the inner side of the crank 37, is a spacer 38 and mounted upon the thimble adjacent to this spacer is the thrust wheel or cone 39 which has sliding movement on the thimble and is constantly urged to the right or outwardly toward the spacer 38 by the expansion spring 40. As shown this spring at one end bears against the thrust wheel 39 and at its other end it bears against the collar 35 and this thrust wheel is so positioned that the rounded outer peripheral edge thereof will ride against the inclined inner surface of the thrust wheel 26 when the arbor 31 and the parts mounted thereon are moved upwardly as in applying the opener to the can.

Secured to the portion 27' of the wheel carrying plate 27, directly beneath the can rim engaging driving wheel 32 and to extend inwardly or to the left of the plate, is the can rest 40'. This rest moves with the plate 27.

Directly above the top edge of the portion 27' of the wheel supporting plate 27 there is secured to the body plate 11 rearwardly of the cutter disc 24, the fixed can rest 41 with the under side of which the top edge of the can rim engages when the can head is moved against the cutter.

Figure 5:
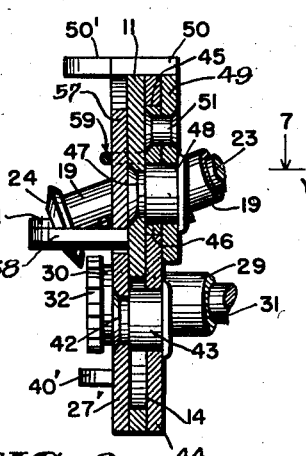
Figure 5 is a vertical transverse section taken substantially on the line 5—5 of Figure 1.

Forwardly of the rim engaging driving wheel the part 27' of the plate 27 carries a rivet 42 with which is formed the pivot portion 43 of enlarged diameter which extends laterally through the elliptical opening 14 as shown in Figure 5. This pivot has the portion 43 extended through and secured in an aperture in the lower end of a link 44 which is positioned against the right hand side of the body plate 11 and, when the device is in working position, extends vertically across the forward end of the body plate as shown in Figure 1.

The upper part of the link 44 has formed therein the relatively large circular eccentric bearing opening 45 in which is mounted the eccentric 46.

Secured in the body plate 11 in a position to be directed through the opening 45 and eccentrically thereto, is the eccentric rivet 47 which has the enlarged pivot portion 46 which passes eccentrically through the eccentric 46. This portion 48 of the rivet 47 also passes through and has mounted thereon, the enlarged or circular end portion 49 of the lever 50. This lever is of substantial length and has a laterally directed flange 56' which limits the clockwise movement of the lever 50 when the latter is operated for the purpose of turning the eccentric 46 whereby to raise or elevate the link 44 and with it the forward end portion 27' of the driving wheel supporting plate 27. The circular end portion 49 of the lever 50 and the eccentric disc, are firmly secured together by the rivet 51 whereby, when the lever 50 is turned it and the eccentric disc 46 will turn around the pivot portion 48 of the rivet 47 and effect the desired up or down movement of the link.

Secured in the body plate 11 on the inner or left hand side thereof and above the forward end of the portion 27' of the wheel plate 27, is a pivot screw which is generally designated 52. This pivot screw comprises the threaded terminal portion 53 which is threadably secured in the opening of the body plate 11, the intermediate larger circular portion 54 and the larger outer end circular portion 55 which joins the head 56 which is of still greater diameter than the adjacent outer portion.

Oscillatably supported upon the intermediate portion 54 of the screw 52, is the small movable or yieldable can rest plate 57 which, as shown in Figure 24, lies against the adjacent side of the body plate 11. The bottom edge of this plate 57 rearwardly of the screw 52, carries the integral inwardly extending ear 58 which cooperates with the fixed can rest 41 in properly positioning the can as the head thereof is penetrated by the cutter 24.

Encircling the outer portion 55 of the pivot screw and interposed between the plate 57 and the cap 56, is the bight or loop of a substantially U-shaped spring 59. This spring has one leg 59' positioned upon the ear 58 while the other leg 59" has an angularly turned portion which is extended through a slot 60 in the plate 57 and is secured in the body plate 11. The spring 59 is biased so that there is a constant tendency for the two legs thereof to move apart and accordingly it will be seen that there will be a constant down thrust upon the ear 58 so that it will normally lie below the plane of the under face of the can rest 41 as shown in Figure 2.

In the operation of this first embodiment of the invention, when it is desired to apply the cutter to a can, if the lever 50 is not in a position 180° from the position in which it is shown in Figure 1, it is swung through an arc of this extent so as to rotate the eccentric disc 46 and effect the lowering of the link 44 together with the parts connected therewith namely the pivot 43, the forward end of the plate 27 and the can rim engaging driving wheel 32 and the parts directly connected therewith. As previously stated when the arbor 31 and the parts carried thereby are lowered by the action of swinging the lever 50 counterclockwise through an arc of approximately 180°, the thrust wheels 26 and 39 will disengage so that a slight longitudinal movement of the arbor 23 can take place to shift the cutter 24 outwardly away from the plane of the driving wheel 32.

When the can is placed in position with the flange or rim engaging the top of the toothed wheel 32 the side of the can will be positioned against the rest 40' which is carried by the pivoted plate 27 and accordingly there will be a convergence of the wall of the can and the side face of the driving wheel 32 toward the top or high side of the driving wheel and the edge of the cutter will tend to press the wall of the can toward the side face of the driving wheel.

This application of pressure to the inner side of the can wall by the circumferential lateral surface near the cutting edge of the cutter is brought about or assisted by the action of the wheels 26 and 39.

After the can has been placed in position on the driving wheel 32, the lever is turned back in a clockwise direction to the position in which it is shown in Figure 1 thus rotating the eccentric disk 46 so as to pull upwardly on the link 44 and move the driving wheel upwardly thus forcing the head of the can against the cutter and causing the latter to penetrate the can head. During this upward movement of the link and the other parts with which it is connected, the thrust wheel 39 will ride against the inclined inner side of the wheel 26 and tend to axially shift the arbor 23 as illustrated in Figure 4. This will bring about a slight movement of the disk 39 against the tension of the spring 40 after the disk 26 and arbor 23 have been shifted to the limit of their movement.

Rotation of the crank 37 will then effect the turning of the wheel 32 and the turning of the can against the cutting edge of the cutter and in addition the turning of the cutter will be assisted through the frictional engagement of the wheels 26 and 39.

Release of the can from the cutter will, of course, be effected by reversely swinging the lever 50 so as to lower the driving wheel 32.

Figure 6:
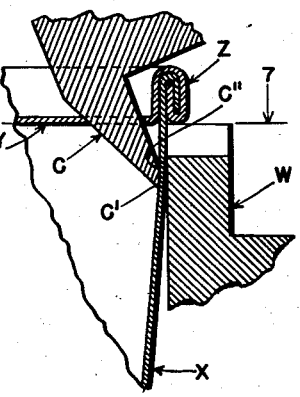
Figures 6 and 7 illustrate on an enlarged scale and more or less diagramatically the novel action resulting from the relative movements of the can rim engaging driving wheel and the rotatable disc cutter in the action of puncturing the can top whereby the wall of the can is gripped or squeezed between a corner of the cutter disc and the adjacent side face of the can rim engaging driving wheel.
Figure 7:
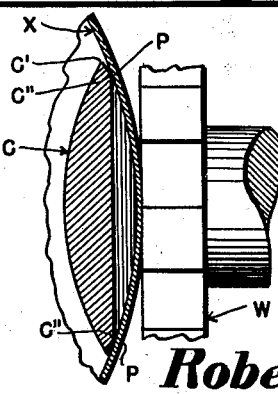

Figures 6 and 7 illustrate diagrammatically and on an enlarged scale the specific action which takes place between the disk cutter and the can rim engaging driving wheel when the driving wheel has been raised and the edge of the cutter disk has penetrated the head of the can. The cutter disk and wheel here shown may represent the disk and wheel 24 and 32 respectively of the embodiment of the invention just described or any one of the disks and wheels of the embodiments hereinafter described and accordingly the reference character C is employed to generally designate the cutter disk and the reference charatcer W is employed to designate the driving wheel. The reference character X generally designates the can, or a portion thereof, while the head of the can is designated Y and the flange of the can is designated Z.

When the can is placed in the cutter the side of the can will bear against the can rest 40' as previously stated and it will be at an angle to the adjacent face of the cutter wheel as designated by the broken line X'. When the driving wheel is moved upwardly it moves along a plane parallel with the adjacent side face of the body plate and the edge of the cutter is forced down through the head of the can and at the same time there is a slight movement of the cutter in the direction of the axis of the arbor 23 so that the cutting edge of the cutter is moved toward the adjacent side face of the driving wheel and also toward the inner side of the can side wall. Consequently when the parts have reached the relative positions shown in Figure 6 the wall of the can will be squeezed between the cutter and the side face of the wheel. The cutting edge of the cutter disk is designated C' and the side of the cutter disk nearest to the driving wheel and adjacent to the cutting edge, is beveled so that there is formed concentrically with the cutting edge the annular edge or corner C''.

The edge or corner C'' is caused to bear against the wall of the can in such a manner as to slightly flex the can wall at the contact point as shown. Inasmuch as the can driving wheel W bears against the wall of the can in an opposing direction at a point slightly above the point of contact of the edge C'' with the can wall, the slight flexing of the wall of the can at the point of contact with the edge C'' permits the can driving wheel to also maintain the rim of the can against the disk cutter at points P, Figure 7, in such a manner as to maintain the can in proper alignment in relation to the can driving wheel and disk cutter to cause the edge of the disk cutter to always engage the end of the can at a predetermined point inward from the wall of the can to most efficiently shear the end out of the can and minimize the effort on the part of the operator to accomplish this result.

It is not intended that the cutting edge of the disk cutter radially engage the wall of the can, but that the portion of the disk cutter at the point of contact between the edge C'' and the can wall, bear against the wall of the can with a degree of resilient firmness.

It is intended that the bevel of the disk cutter be of such angle that the edge of the disk cutter engages the end of the can at such point inward from the wall of the can as to most efficiently shear the end out of the can. It is also intended that the resilient wedging of the can driving wheel and the wall of the can between the thrust means positioned to the right of the can driving wheel and the disk cutter, namely the contacting thrust wheels 26 and 39, maintain the rim portion of any size or shape can against the disk cutter at points P, Figure 7, at all times for most efficient operation. The points P are sufficiently near the circumference of the disk cutter that friction between the said wall of the can and the said disk cutter at said points P does not materially increase the effort required to rotate the disk cutter.

Figure 8:
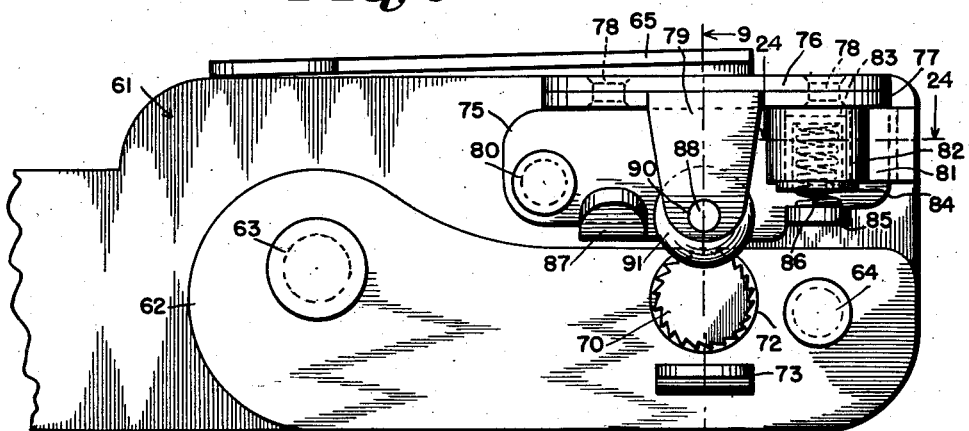
Figure 8 is a view in elevation of the left hand or inner side of a second embodiment of the invention.
Figure 9:
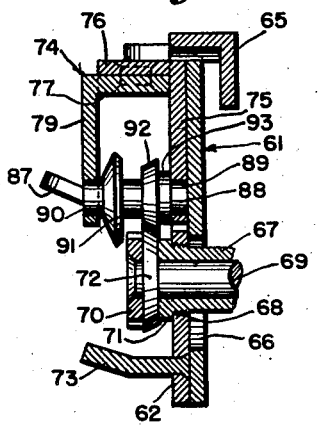
Figure 9 is a vertical transverse section taken substantially on the line 9—9 of Figure 8.

Figures 8 and 9 illustrate a second embodiment in which may be used substantially the same can puncturing thrust means as that shown and described in connection with the first embodiment. Accordingly the parts lying to the right or upon the outside of the body plate are not illustrated in connection with this embodiment as they are essentially the same as those illustrated in Figures 1 to 5, for effecting the raising and lowering of the can rim engaging driving wheel supporting plate.

In this second embodiment the body plate of the cutter is generally designated 61. As shown in Figure 8 there is positioned upon the inner or left hand side of this body plate, the relatively long driving wheel supporting plate 62 which is mounted at its rear end upon the rivet 63 which is secured in the body plate and upon which the plate 62 has vertical oscillation. At its forward end the plate 62 carries a rivet 64 which corresponds to the rivet 42 and extends through the body plate in a suitable slot corresponding to the slot 14, for connection with a linkage thrust mechanism of the same character as that shown in Figure 5. Such thrust mechanism is operated by a lever 65 corresponding to the lever 50.

The body plate 61, rearwardly of the pivot rivet 64, has a substantially vertical elliptical slot 66 therein, corresponding to the slot 13 and through which extends the bearing sleeve or journal 67 which at one end is threadably secured in a suitable threaded opening 68 formed through the forward end portion of the plate 62.

Rotatably mounted in the bearing sleeve 67 is the shaft 69 upon the inner or left hand end of which is secured the can rim engaging driving wheel 70.

The bearing sleeve 67 has a spacer collar 71 on the end thereof adjacent to the wheel carrying plate 62, which collar bears against the plate and secured to the shaft 69 between the collar 71 and the wheel 70 is a cone thrust wheel 72 the major diameter of which is slightly greater than the diameter of the wheel.

Secured to the forward end of the drive wheel carrying plate 62 directly beneath the rim engaging driving wheel is the can rest 73 against which the side of the can bears to be held at an angle to the adjacent face of the wheel 70 in the manner illustrated in Figure 6.

The numeral 74 generally designates the disk cutter carrier which is mounted upon the inner side of the body plate 61. This carrier comprises an angle plate which has a flange 75 which is disposed against the inner side of the body plate 61 and a top laterally extending flange 76 the top surface of which is substantially in the plane of the top edge of the plate 61 when the parts are at rest.

Secured to the under side of the flange 76 is a plate 77, the attachment of this plate and the flange 76 being by means of rivets 78 or in any other suitable manner, and integral with the free inner edge of the plate 77 and substantially midway between its ends as shown in Figure 8, is the depending ear 79.

As previously stated the vertical flange 75 is disposed against the inner side of the body plate 61 and at its rear end this flange is pivotally secured to the body plate by the pivot rivet 80 whereby vertical oscillatory movement of the entire cutter wheel carrier is permitted.

At the forward end of the body plate 61 such plate has formed integrally therewith the inwardly extending lug 81 with which is integrally formed the substantially semi-circular guide 82. The lug 81 is formed to function as a guide for the forward end of the flange 75 whereby movement of the flange away from the body plate is prevented and the semi-circular portion 82 is in opposed relation with the inner side of the flange 75 to serve as a receiver for a downwardly opening cup 83, the mouth of which is defined by the outwardly extending rim 84 which bears against the lower end of the guide 82.

Directly below the downwardly opening cup 83 the flange 75 has formed integrally therewith the inwardly directed spring support 85 and upon the top of this support is mounted an expansion spring 86, the upper end of which is housed in the cup 83. This spring opposes upward movement of the forward end of the cutter carrier.

Near the rearward end of the cutter carrier is the can rim engaging rest 87 which is carried by and at the bottom edge of the cutter wheel carrier flange 75 and the under face of which is in a plane slightly below the under face of the spring support 85.

The numeral 88 designates a cutter wheel carrying shaft, one end of which is journaled in the opening 89 in the flange 75 while the opposite end is journaled in the opening 90 which is formed in the lower end of the ear 79. Secured to the inner end of the shaft 88 is the disk cutter 91 which lies in a plane inwardly of the rim engaging driving wheel 70 and also, carried by and secured to the shaft 88 in the plane of the cone wheel 72, is the reversely tapered cone wheel 92 the periphery of which is engaged by the tapered periphery of the wheel 72 when the can rim engaging wheel is raised to operating position as it is shown in Figure 9.

Interposed between the cone wheel 92 and the adjacent flange 75 of the cutter carrier, is a spacing collar 93. The cutter 91 is spaced slightly from the ear 79 so that when the thrust wheels 72 and 92 are separated the cutter shaft 88 can shift slightly to the left and when the cone wheels are brought into engagement their engaging oppositely tapered peripheral surfaces will effect movement of the cutter and the supporting shaft to the right bringing the edge of the cutter in closer proximity to the adjacent face of the driving wheel.

In the operation of this second embodiment it will be understood that in order to prepare the cutter to receive a can if the driving wheel 70 is not already in its lowermost position, the lever 65 is swung from the position in which it is shown in Figure 8 through approximately 180° whereby the driving wheel 70 will be lowered. As previously stated this lowering action is effected through the medium of a linkage coupling with the plate 62 through the medium of the rivet 64, of the same type as that shown in connection with the first embodiment.

After the can has been placed in position with its rim or flange resting upon the top of the driving wheel, the lever 65 is swung back toward the rear to the position shown in Figure 8 which action raises the driving wheel and brings the head of the can against the cutting edge of the disk cutter 91 forcing the cutter through the can head. Simultaneously with this action the conical thrust wheels 72 and 92 are brought into peripheral engagement and axial thrust is applied to the cutter shaft 88.

The can rest 87 prevents the can from tilting while engaged in the device. The forward end of the flange 75 or, of the entire cutter carrier 74 normally seats on the lug 81 when a can is not engaged in the device, as illustrated in Figure 8. The forward end of the cutter carrier can oscillate upwardly a predetermined amount against the tension of the spring 86 until the portion 85 seats against the flange 84. This distance is not so great but that the end of the can will be punctured even though thrust from the end of the can against the disk cutter 91 compresses the spring until the portion 85 seats against the flange 84 as stated. After the end of the can has been punctured the spring 86 has sufficient tension to assure downward thrust on the disk cutter to cause the wall of the can, the can driving wheel 70 and the cone 72 to be wedged between the disk cutter 91 and the cone 92. This wedging action maintains the teeth of the can driving wheel 70 under the full width of the under edge of the rim or flange of the can for radial traction with the said under edge of the can rim or flange. The wedging of the wall portion of the can, the can driving wheel 70 and the cone 72, resiliently, between the disk cutter 91 and the cone 92, imparts a frictional driving connection to the disk cutter 91 and the cone 92, to supplement the radial traction of the teeth of the can driving wheel 70 with the under edge of the rim or flange of the can for feeding the can through the device to cut out the end thereof. Inasmuch as the disk cutter can be moved upwardly against the tension of the spring 86, the disk cutter can be forced laterally away from the can driving wheel a predetermined amount when necessary, such as when passing the seam of a can. When a can is engaged in the device, the disk cutter does not bear laterally against the adjacent supporting ear 79 and the portion 93 does not bear laterally against the portion 75 of the cutter support, all thrust in the bearings of the disk cutter being reduced to radial thrust only to facilitate rotation of the said disk cutter.

Figures 10 to 13 inclusive show a third embodiment of the invention which embodies the two straight handles 94 and 95, the opposite longitudinal edges of which are approximately parallel as shown when the device is in use.

The rear ends of the handles 94 and 95 are connected by the vertical plate 96. This plate is secured at its top end securely to the upper handle 94 by the two rivets 97 while the rear end of the lower handle 95 is pivotally attached to the lower end of the plate 96 by the pivot rivet 98 which is on the vertical center of the plate.

Forwardly from the pivot rivet 98 the lower handle 95 has formed therethrough the threaded opening 99 in which is threadably secured the flanged end of the bearing sleeve 100, the flange upon the inner or left hand end of this sleeve being designated 101.

Directly below the bearing sleeve 100 the lower handle 95 has formed integrally with the bottom edge thereof the laterally extending fixed can rest 102 which is disposed at a slight upward inclination.

Rotatably mounted within the bearing sleeve 100 is the driving wheel shaft 103 upon the inner end of which is fixed the peripherally toothed can rim engaging driving wheel 104. Interposed between this wheel 104 and the flange or rim 101 of the bearing sleeve is the tapered or conical thrust wheel 105.

The outer or right hand end of the shaft 103 is screw threaded as indicated at 106 and on this end is threaded the tubular sleeve 107 which is slotted across its outer end to receive the central portion of the flat crank member 108. This crank member and the sleeve 107 are rigidly secured together by the rivet 109.

Disposed against the inner or left hand side of the top handle 94 is the elongated rectangular disk cutter supporting frame which is generally designated 110. This frame comprises the long side portion 111 from each end of which extend the spaced parallel end portions 112 each of which terminates in an attaching ear 113, these ears being in aligned relation and in spaced parallel relation with the side 111.

The rearward one of the ears 113 is secured to the handle by the rear one of the two rivets 97 while the opposite ear is secured to the handle by a corresponding rivet 114.

Disposed transversely of the frame 110 and supported between the handle 94 and the outer side 111 of the frame, is the disk cutter shaft 115. One end of this shaft is rotatably mounted in the bearing opening 116 in the longitudinal part 111 of the frame and the other end of the shaft is mounted in a corresponding bearing opening 117 in the top handle 94.

Secured to the shaft 115 in spaced relation with the side 111 of the frame, is the disk cutter 118. The plane of the cutter is toward the inside of the device from the plane of the rim engaging driving wheel 104.

Also secured to the shaft 115 in the plane of the conical thrust wheel 105 is the oppositely tapered conical thrust wheel 119, the peripheral surface of which is engaged by the oppositely tapered peripheral surface of the thrust wheel 105 when the rim engaging driving wheel and disk cutter are moved together as in the operation of applying the opener to a can.

In the use of this embodiment the handles 94 and 95 are separated to the extreme, to lower the can driving wheel 104 or move it away from the overlying disk cutter 118. The device is then placed on the can with the edge of the cutter engaging the top end of the can and the handles are then pressed together to raise the can driving wheel 104 to engage the under side of the can rim flange and thus force the head of the can against the cutting edge of the disk cutter to effect the puncturing of the head. This action wedges the wall of the can, the can driving wheel 104 and the cone 105 between the disk cutter 118 and the upper cone 119. As the handles are gripped by one hand to resiliently maintain this wedging action, the thumb and finger operating handle 108 is rotated clockwise until the end is cut out of the can. The handles are then again separated to remove the device from the can.

When a can is engaged in the device, the can opener will be canted in such a manner that the can guard 102 will be in approximately a horizontal position. As in the other embodiments of the invention, the can guard bears against the wall of the can to maintain the lower end surface of the can driving wheel a predetermined distance away from the wall of the can. While a can is engaged in the device, the top of the rim or flange of the can engages the under edge of the portion 112 which is rearwardly of the disk cutter, to prevent the can from tilting while the end is being cut out.

As the handles 94 and 95 can be separated slightly against the resilient grip of the operator, the disk cutter 118 can be forced laterally away from the can driving wheel 104, a predetermined amount when necessary, such as when passing the seam of a can.

The shaft 115 also carries, between the cone 119 and the adjacent face of the handle 94, the spacer collar 120 and when a can is engaged in the device, the disk cutter 118 does not bear laterally against the adjacent portion 111 of the frame 110 and the collar 120 does not bear laterally against the adjacent handle 94.

Figure 17:
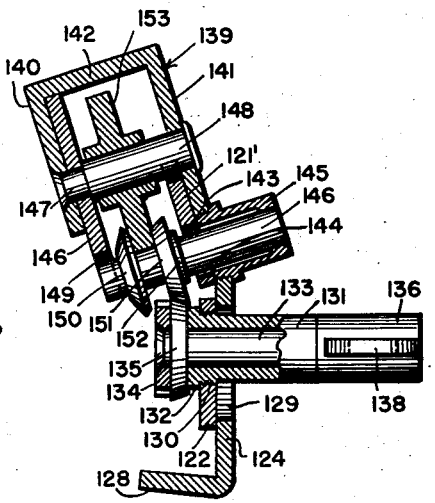
Figure 17 is a vertical transverse section taken substantially on the line 17—17 of Figure 14.
Figure 16:
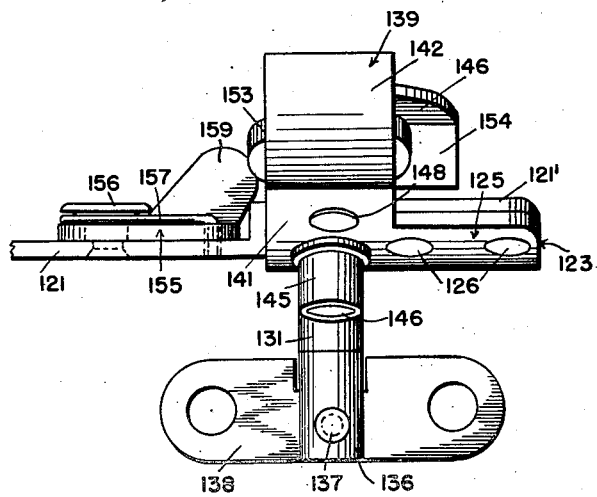
Figure 16 is a view in top plan of the forward end of the fourth embodiment.
Figure 23:
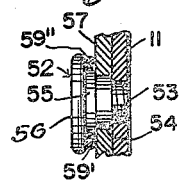
Figure 23 is a detail section taken on line 23—23 of Figure 2.

Figures 14 and 17 illustrate a fourth embodiment of the invention in which are employed two handles 121 and 122 corresponding to the handles 94 and 95 of the embodiment of the invention illustrated in Figure 10. In this embodiment the lower handle 122 is straight or in one plane throughout its length whereas the upper handle has a portion of the rear end thereof inclined to the left or inner side, from the vertical plane of the side faces of the two portions of the handle which the user grips in his hand. This inclined or canted rear end portion of the top handle 121 is designated 121' and is clearly illustrated in Figures 16 and 17.

Extending across and joining the rear ends of the handles 121 and 122 is the plate body which is generally designated 123. This plate body comprises the lower portion 124 and the upper portion 125, the latter portion also being canted or angled and having the angled portion 121' of the top handle secured thereto by the rivets 126.

The rear end of the lower handle 122 is attached to the lower portion 124 of the body plate by the pivot rivet 127 whereby the lower handle may be oscillated with respect to the upper handle.

Figure 15:
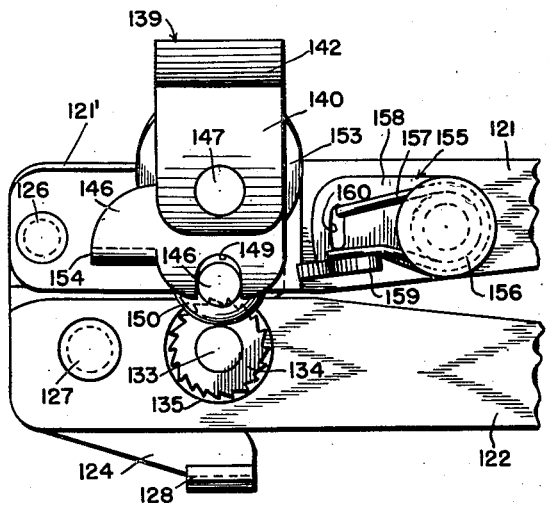
Figure 15 is a view in elevation of the left hand side of the fourth embodiment.

The lower portion 124 of the body plate has a part extending downwardly beyond the bottom edge of the bottom or lower handle as is clearly shown in Figures 14 and 15 and this extended lower edge portion has the laterally or inwardly turned cam rest 128 which projects a substantial distance to the left beyond the lower handle as shown in Figure 17.

Directly above the can rest 128 the forward edge of the lower portion of the body plate is cut out or recessed as indicated at 129 and the handle 122 has a threaded aperture 130 in which is threadably secured the inner end of the bearing sleeve 131, which end of the sleeve carries the encircling flange or collar 132 which bears against the inner side of the handle.

Extending through and rotatably mounted in the bearing sleeve 131 is the can rim engaging driving wheel carrying shaft 133, to the inner end of which is secured the peripherally toothed can rim engaging wheel 134. Also carried upon and secured to the shaft 133 to be operatively maintained between the wheel 134 and the flange 132, is the cone thrust wheel 135.

Upon the outer end of the shaft 133 is mounted the hub 136, the connection being preferably of the same character as that shown in Figure 13 and extending transversely of this hub and secured thereto by the rivet 137, is the crank member 138 by means of which the shaft may be given rotation.

Integral with the upper portion 125 of the body plate is the inclined frame unit 139 which comprises the inner and outer spaced parallel plate portions 140 and 141 respectively and the cross connecting top portion 142. The portion 141 is here shown as being an integral continuation of the body plate and accordingly the frame 139 forms an integral part of such plate.

In vertical alignment with the shaft 133, the upper portion 125 of the body plate has a threaded opening 143 formed therein. This opening is aligned with an opening 144 formed in the adjacent portion of the upper handle.

Threadably secured in the opening 143 is an end of a bearing hub 145 in which is rotatably mounted an outer end portion of the cutter disk carrying shaft 146. This shaft passes through the opening 144 as shown and is perpendicular to the inclined sides 140 and 141 of the frame 139.

The freely depending portion 140 of the frame 139 has secured thereto upon the side adjacent to the outer portion 141, a bearing plate 146', by means of the reduced rivet forming end portion 147 of the journal pin 148 which extends through an opening in the outer side 141 of the frame. This plate 146' has a bearing slot or recess 149 formed in the lower end thereof, which lower end projects a substantial distance beyond the lower end of the side 140 of the frame 139, in which recess the inner end of the shaft 146 is positioned.

The shaft 146 carries, adjacent to its inner end, but spaced from the plate 146', the cutter disk 150 and in spaced relation with this cutter disk the shaft also carries the cone thrust wheel 151, the taper of which is opposite to that of the cone wheel 135 with which it cooperates.

Upon the outer side of the wheel 151, the shaft 146 carries the spacer collar which separates the cone wheel from the adjacent inclined portion of the handle 121 but is in spaced relation with such handle portion as illustrated in Figure 17.

Rotatably supported upon the journal pin or rivet 148 is an anti-frictional thrust wheel 153. This wheel has radial or peripheral contact with the shaft 146 between the disk cutter and the cone thrust wheel 151.

The bearing plate 146' has formed integrally therewith, at its rear edge and above the lower end, the outwardly extending fixed can rest 154. This rest is directed toward the inclined portion 121' of the upper or top handle 121.

Cooperating with the fixed rest 154, which is designed to be engaged by the top edge of the can rim or flange, is a movable or oscillatable rest with which the can rim or flange contacts, which is generally designated 155. This resilient can rest comprises a supporting rivet 156 which is of the same form or construction as the previously described spring supporting rivet associated with the resilient rest shown in Figure 2 and in addition to supporting the looped or bent spring 157, it supports for vertical oscillation, the plate 158 from the bottom edge of which projects the foot 159 with the under surface of which the can rim contacts. The spring 157 bears at one end upon the top of the foot element 159, as shown, while the other end of the spring is turned to extend through the arcuate slot 160 and is secured in the adjacent handle 121.

In the use of this embodiment of the invention it will be obvious that when the device is to be applied to a can the handles 121 and 122 must be separated and this separation will move the thrust wheels 135 and 151 apart and simultaneously shift the driving wheel 134 away from the cutter so that the device can be placed over the edge of a can with the driving wheel beneath the can rim and the cutter overlying the can head. By then forcing the handles together the disk cutter will be caused to penetrate the top of the can, the wall of the can being wedged between the beveled outer side of the disk cutter and the adjacent face of the drive wheel 134 in the manner described in connection with the diagrammed parts of Figures 6 and 7. When the device and can are coupled together in this manner the top of the rim or flange of the can engages the fixed can rest 154 which prevents the can from tilting while the end is being cut out. Also, while a can is engaged in the device, the foot portion 159 of the resilient can rest, having been moved slightly upwardly from the position illustrated in Figure 15, seats on top of the rim or flange of the can to exert a downward pressure to assure radial traction of the teeth of the can driving wheel with the under edge of the rim or flange of the can. The wedging of the wall portion of the can, the can driving wheel 134 and the cone wheel 135, resiliently, between the disk cutter 150 and the cone wheel 151 imparts a frictional driving connection to the disk cutter 150 and the cone 151 to supplement the radial traction of the teeth of the can driving wheel with the under edge of the rim or flange of the can for feeding the can through the device to cut out the end thereof.

Inasmuch as the handles 121 and 122 can be separated slightly, against the resilient grip of the operator, the disk cutter 150 can be forced laterally away from the can driving wheel 134 a predetermined amount when necessary, such as when passing the seam of a can. Inner and outer lateral movement of the disk cutter 150 can be limited by either engagement of the disk cutter with the adjacent part 146' and engagement of the reduced portion of the cone 152 with the adjacent handle portion 121' respectively or by lateral engagement of the hub portion of the wheel 153 with the adjacent part 146' and the adjacent handle part 121'. However, when a can is engaged in the device, the disk cutter 150 and the wheel 153 do not bear laterally against the selected lateral limiting means, all thrust in the bearings of the disk cutter and the wheel being reduced to radial thrust only to facilitate rotation of the said disk cutter.

The guide bearings 149 and 145 for the ends of the journal 146 permit the circular portion of the shaft or journal to always bear upwardly against the overlying anti-frictional wheel 153. Practically all of the thrust is taken by the wheel 153. Due to the size of the wheel 153 and its bearing, operating friction is greatly reduced to further facilitate rotation of the disk cutter.

In operation, the end of the can exerts an upward thrust on the disk cutter 150. A substantially equal upward thrust is exerted by the cone 135 on the cone 151. The positioning of the wheel 153 between the disk cutter 150 and the cone 151 causes the said wheel to receive practically all thrust and, due to its size in relation to the shaft portion 146, greatly reduces the amount of effort required to rotate the disk cutter 150.

In the fifth embodiment of the invention which is illustrated in Figures 18 to 21 inclusive the upper and lower handles are designated respectively 161 and 162. The upper handle has the rear end 161' inclined slightly to the left or inside as shown and the adjacent rear ends of the handles are connected by the vertical plate 163. The upper half of this plate 163 is angled or inclined to engage against the adjacent inclined portion 161' of the upper handle, and such portion of the plate is secured to the adjacent portion of the upper handle by the rivets 164. The lower half of the body plate 163 is connected to the rear end of the lower handle 162 by the pivot rivet 165.

The lower portion of the body plate 163 is essentially vertical when the device is in use so that the upper half and the portion 161' of the upper handle are inclined to the left as illustrated most clearly in Figure 21. Upon the lower edge of the inclined portion 161' of the upper handle is formed the integral fixed can rest 166.

On the lower handle, at the lower edge thereof and forwardly from the rest 166 is a fixed can rest 167.

Directly above the fixed rest 167 and forwardly of the body plate 163, the lower handle has formed therethrough the threaded opening 168. In this opening is threadably secured an end of the bearing sleeve 169 and at the end of this sleeve adjacent to the threaded portion, the sleeve carries the encircling flange 170 which bears against the adjacent or inner side of the handle.

Rotatably mounted in the bearing sleeve 169, is the shaft 171. This shaft carries upon the inner end, the peripherally toothed can rim engaging driving wheel 172 and upon the outer end it is of reduced polygonal cross sectional form as indicated at 173.

Mounted upon the reduced portion 173 of the shaft is the relatively large cone disk 174.

Outwardly from the reduced portion 173, the shaft 171 is screw threaded as indicated at 175 and this threaded portion has engaged therewith the hub portion 176 of the hand crank, not shown.

Directly in line with the threaded opening 168, transversely of the portion 161' of the upper handle 161, is a threaded opening 177 in which is engaged the tubular bearing 178, such bearing being threaded intermediate its ends adjacent to a position locating collar 179, for engagement in the opening 177 whereby a part of the bearing sleeve projects beyond each of the two side faces of the portion 161' of the handle.

Rotatably mounted in this bearing sleeve 178 is the cutter wheel shaft 180 and upon the inner end of this shaft is mounted the cutter wheel or disk 181, the edge of which is in relatively close proximity to the inner side face of the wheel 172, when the handles are in closed position as shown in Figure 21.

The outer end of the shaft 180 is of polygonal cross section as indicated at 182, and has mounted thereon the cone disk 183, the tapered periphery of which is reverse to the tapered periphery of the cone wheel 174 as shown so that these wheel peripheries will come into bearing contact when the opener is in working position.

Mounted upon the upper handle 161 forwardly from the inclined portion 161' is a pivot rivet, generally designated 184 and of the same form or construction as the rivet shown in Figure 24. This pivot rivet 184 supports a yieldable can rest plate 185 which has the inwardly directed angular portion 186 at its lower edge which cooperates with the rest 166. This plate 185 is slotted as indicated at 187 as in the first described yieldable rest structure, to receive one end of a looped or U-shaped spring 188 which is secured in the adjacent handle body, the other end of this spring resting upon the top of the rest 186.

It is believed that the operation of the embodiment of the invention illustrated in Figures 18 to 21 will be readily apparent. When the device is to be applied to a can the handles 161 and 162 are separated, thereby separating the wheel 172 from the cutter disk 181. The device is then applied to the can so that the periphery of the wheel 172 will engage under the can flange, the side of the can resting against the rest 167. By then closing the handles the periphery of the cutter disk 181 will be forced through the head of the can and the inner level of the disk will come into opposed relation with the adjacent face of the driving wheel 172. In this construction the resilient can rest 186 serves the same purpose as the rest 58 previously described. Otherwise, the operation of this embodiment is essentially the same as that of the third embodiment. However, the positioning of the cones 174 and 183 at the outer ends of the bearings 169 and 178, respectively, provide better bearings for the shafts of the disk cutter and the can driving wheel.

In the construction illustrated in Figure 22 the forms of the cones are slightly different from the forms illustrated in Figures 18 to 21. Otherwise the construction is the same as the construction of Figures 18 to 21 and for this reason the view has been indicated as a section on the line 22—22 of Figure 18. In this construction the reference numeral 174a designates a double beveled cone which is used in substitution for the cone 174. The reference numeral 183a designates a double beveled cone for cooperation with the cone 174a and which, of course, is used in substitution for the cone 183.

The operation of these double beveled cones is the same as that of the single beveled cones, except that cooperation of the two double beveled cones does not wedge the can driving wheel laterally against the disk cutter, but urges the can driving wheel toward the disk cutter only to a point where a predetermined spacing exists between the can driving wheel and the disk cutter. Although the action of the cone 174a in cooperation with the cone 183a, does not wedge the can driving wheel toward the disk cutter to a point further than a predetermined spacing between the can driving wheel and the disk cutter, it will be observed that the disk cutter can be forced laterally further away from the can driving wheel than the predetermined spacing when necessary, such as when passing the seam of a can, in the same manner as in the third embodiment.

Figure 25 illustrates another embodiment or modification of the structure shown in Figure 13. This figure is a cross sectional view taken in the same plane as the plane for Figure 13 and this embodiment is designed to afford a more economical fabrication of the structure for commercial production and it will be recognized that it may be applied to other embodiments of the invention.

In this embodiment of the invention the upper handle is designated 195 and the lower handle is designated 196. Connecting between the rear ends of these handles is the body plate 197 which functions in the same manner and is secured to the upper handle in the same way as the body plate 96 of the third embodiment.

The lower handle 196 has the can rest 198 extending upwardly and inwardly therefrom and above this rest there is formed in the lower handle the bearing opening 199 in which is rotatably mounted the journal portion 200 of the can driving wheel shaft 201.

The inner end portion of the shaft 201 is reduced and screw threaded as indicated at 202 and has threadably mounted thereon the can rim engaging driving wheel 203.

The numeral 204 designates a portion of the upper holding handle 195 which is off-set to the right from the main portion of the holding handle as shown and secured to the upper handle and opposing the off-set portion 204 is the cutter disk supporting frame 205 which has a side portion 206 which is in spaced parallel relation with the off-set portion 204 of the upper handle.

These portions 204 and 206 have formed therein the bearing openings 207 and 208 respectively, in which are rotatably mounted the ends of the cutter disk supporting journal 209.

The numeral 210 designates the cutter disk which is secured to the end of the journal 209 adjacent to the support 206 and adjacent to the opposite end of the shaft 209 is mounted the cone wheel 211 which is in a plane to the right of the plane of the handle 196.

Mounted upon the shaft 201 for peripheral contact with the wheel 211, is the cone wheel 212. These wheels are brought into contact when the handles of the device are closed and rotation is transmitted from the lower cone wheel to the upper cone wheel.

The outer end of the shaft 201 is of reduced size and suitably flattened or squared to receive the thumb and finger operating handle 213.

If desired, instead of off-setting the upper one of the two handles as indicated at 204, to position the disk cutter laterally for cooperative working relation with the can driving wheel and the cone carried on the can driving wheel shaft, a suitable portion of the lower holding handle 196 may be inwardly off-set for such purpose.

As recited in the objects of the referenced copending application, it will be observed that thrust in the bearings for the journals of the disc cutter is practically reduced to radial thrust only, providing greater ease of rotation for the said disc cutter, as well as eliminating wear in the bearings of the most harmful type.

It will also be seen that inasmuch as the side wall of the can, the can driving wheel, and the thrust cone or wheel positionally coaxially therewith are resiliently wedged between the disc cutter and thrust cone or wheel integrally and coaxially therewith, a frictional driving connection is established to supplement traction of the cutting edge portion of the disc cutter with the top or end of the can to rotate the said disc cutter.

It will also be observed that the predetermined lateral spacing between the can driving wheel and the disc cutter is not increased by reason of wear in the bearings of the disc cutter or can driving wheel, and that the wedging action obtained by such cooperation between the disc cutter and integral thrust cone or wheel with the can driving wheel and coaxially positioned resilient thrust cone or wheel always maintains the teeth of the can driving wheel under the full width or thickness of the rim or flange of a can for most efficient operation, even after extensive use.

Of course, it will be understood that the elimination of torsional thrust in the bearings for the journals of the disc cutter, together with the frictional driving connection imparted to the disc cutter as previously described, materially reduces the effort required to rotate the can driving wheel for feeding a can through the device for cutting out the end thereof.

As described, it is intended that the present invention possess properties of unusual efficiency, as well as greater durability.

I claim:

1. A can opener of the rotary drive wheel type comprising two members, a coupling therebetween facilitating movement of one of the members relative to the other, a can rim engaging driving wheel rotatably supported on one member, means for rotating the wheel, a disk cutter supported by the other member, the cutter and wheel being moved into coacting relation upon movement of one member relative to the other, the support for the cutter being of a character to permit limited axial movement of the cutter, a circular element supported for rotation on the turning axis of the wheel, and a second circular element connected with the cutter, said circular elements being peripherally opposed and positioned to be moved into overlapping engaged relation upon movement of the cutter and wheel into coacting relation, said elements having their peripheries smooth and transversely inclined for sliding camming engagement to impart axial thrust to the cutter.

2. A can opener of the rotary drive wheel type, comprising two members, coupling means between the members facilitating movement of one of the members relative to the other, a can rim engaging driving wheel rotatably supported by one of the members, means for rotating the driving wheel, said driving wheel having a side face against which a wall of a can bears when the opener is in operation, a rotary disk cutter supported by the other member for rotation on an axis intersecting the plane of movement of the members one with respect to the other whereby said driving wheel has the said face thereof moved across the cutting edge of the cutter, said disk cutter having a narrow bevel face adjacent to the cutting edge and upon the side adjacent to the wheel, the said face of the wheel being disposed in close proximity to the said beveled face of the cutter disk when the cutter disk and wheel are in cooperative working relation whereby the wall of the can is between such faces, and means carried by one of said members in a plane below the wheel and occupying a position with respect to the said one face of the members beyond the plane of the can engaged face of the cutter for maintaining the said wall of the can oblique to the said face of the wheel at the beginning of the operation of moving the cutter disk and driving wheel into cooperative working relation, said cutter disk being supported for limited axial movement, and coacting elements supported by the two members for engagement one with the other upon the movement of the disk cutter and the wheel into the said cooperative working relation, the engaging portions of said elements being formed to have sliding camming contact to apply axial thrust to the cutter in a direction to urge movement of the cutter disk face and the wheel face together.

3. A can opener of the rotary drive wheel type comprising two members coupled together for relative movement, a can rim engaging driving wheel rotatably supported by one of the members, means for rotating the wheel, a journal rotatably supported upon the other member for limited axial movement, a cutter disk secured to an end of the journal, the cutter disk having its edge moved toward and away from the rim engaging driving wheel upon predetermined relative movement of the members, a disk operatively coupled with the rim engaging wheel to turn therewith, a disk operatively coupled with the journal to turn with the journal, said disks being disposed to be brought into contacting relation upon movement of the members in a direction to move the cutter disk and wheel together whereby axial thrust is imparted to the journal to shift the cutter disk toward a side of the rim engaging driving wheel.

4. A can opener of the rotary drive wheel type comprising two members pivotally coupled together for relative movement, a can rim engaging driving wheel rotatably supported on one member, means for rotating the wheel, a journal rotatably supported by the other member, a disk cutter secured to an end of the journal adjacent to said wheel, said journal being supported for limited axial movement, said disk cutter having the lower part of the can top contacting cutting edge moved in a direction perpendicular to the turning axis of the wheel upon movement of the said members relatively in one direction whereby the cutting edge of the disk is brought into a position adjacent a side of the wheel, and cooperating engageable members connected with the wheel and cutter for imparting axial thrust to the journal to shift the cutter axially toward the wheel upon relatively moving the two members in the said one direction.

5. A can opener of the character stated in claim 4 wherein the axis of said cutter disk journal is oblique to the rotary axis of the rim engaging driving wheel.

6. A can opener of the character stated in claim 4 wherein the said means for imparting axial thrust to the journal comprises a pair of disk members one being secured to the journal and the other being coupled with the rim engaging driving wheel, the said journal having its axis oblique to the rotary axis of the driving wheel and the disk members being brought into overlapping contacting relation upon the relative movement of the two members in the said one direction.

7. A can opener of the character stated in claim 4 wherein the said means for imparting axial thrust to the journal comprises a pair of disk members one being secured to the journal and the other being coupled with the rim engaging driving wheel, the said journal having its axis oblique to the rotary axis of the driving wheel and the disk members being brought into overlapping contacting relation upon the relative movement of the two members in the said one direction, the disk member connected with the rim engaging driving wheel being supported for shifting movement along the axis of rotation of the driving wheel, and spring means engaging and constantly urging movement of the last mentioned disk member away from the driving wheel and into contact with the other disk member.

8. A can opener of the rotary drive wheel type, comprising a body plate, a plate disposed at one side of the body plate and pivotally coupled therewith for limited swinging movement in a plane paralleling the adjacent face of the body plate, a can rim engaging driving wheel rotatably supported by the pivoted plate for limited movement therewith relative to the body plate, a journal extending transversely through the body plate and supported for rotation on an axis oblique to the turning axis for said wheel, means for rotating said wheel, a cutter carried upon one end of the journal in close proximity to the wheel, the wheel being movable into a cooperative working relation with the cutter disk, a link member disposed across the body plate upon the side thereof opposite from the pivoted plate, means coupling the link member and pivoted plate together for movement together independently of the body plate, an eccentric bearing in the link member, an eccentric disk in said bearing, means eccentrically coupling the disk with the body plate, and a lever secured eccentrically to the disk for imparting rotation thereto for moving the link and pivoted plate together relative to the body plate.

9. A can opener of the character described in claim 8 wherein said can rim engaging driving wheel support comprises a bearing sleeve which is secured to the pivoted plate, a shaft extending through the bearing sleeve and having the wheel secured to one end thereof, the means for rotating the wheel being secured to the other end of said shaft, said disk cutter supporting journal being supported by the body plate for limited axial movement, a disk member secured to the journal upon the end opposite from the cutter, and a disk member encircling and supported by said bearing sleeve, said disk members being moved into overlapping contacting relation upon movement of the wheel into operative relation with the disk cutter and functioning to impart axial thrust to the journal in a direction to shift the disk cutter axially toward the wheel.

10. A can opener of the rotary drive wheel type comprising two members pivotally coupled together for relative movement, a can rim engaging driving wheel supported by one of the members, means for rotating the driving wheel, a journal rotatably supported by the other member, said journal having limited axial movement, a cutter disk carried by the journal in a position off-set from a face of the wheel, the relative movement of said members in one direction moving the cutter and wheel into edge overlapping relation, a cone wheel supported upon said journal, and a cone wheel connected coaxially with the rim engaging wheel, said cone wheels having oppositely directed tapered edges and being positioned for the driving engagement of said edges together upon the movement of the disk cutter and rim engaging wheel into the said overlapping relation.

11. A can opener of the character stated in claim 10, with a fixed can rest carried by the member supporting the rim engaging driving wheel and projecting across the edge of the driving wheel remote from the cutting disk and beyond the face of the wheel nearest to the cutter, for engagement by the side wall of a can to maintain the can side wall at an angle to the adjacent side of the rim engaging wheel.

12. A can opener of the character stated in claim 10 wherein the journal supporting the cutting disk is disposed with its axis oblique to the axis of rotation of the rim engaging driving wheel.

13. A can opener of the character stated in claim 10 wherein one of said cone wheels has a peripheral ridge and the other one of the cone wheels has a peripheral recess into which the peripheral ridge of the first wheel engages.

14. A can opener of the character stated in claim 10, with a journal pin supported in spaced parallel relation with the cutter disk supporting journal, and a bearing wheel rotatably supported on the journal pin and having peripheral engagement with the cutter disk journal between the disk and the cone wheel carried by the journal.

15. A can opener of the rotary drive wheel type comprising two members, a pivotal coupling between the members facilitating movement of one member relative to the other, a relatively long bearing sleeve extending transversely through and secured adjacent to one end to one member, a can rim engaging driving wheel supporting shaft extending through the bearing sleeve, a can rim engaging wheel secured to one end of the shaft, means upon the other end of the shaft, for rotating the same, a frame member secured to the other member above said shaft, a relatively long tubular bearing sleeve secured at one end to the frame member, a journal having a substantial portion of one end disposed in said bearing sleeve and rotatably mounted therein, bearing means carried by said frame member and receiving the other end of the journal, said journal being disposed with its long axis oblique to the axis of rotation of the shaft, said journal having limited axial movement in the adjacent bearing sleeve, a cutter disk secured to the journal for cooperative action with the wheel, the disk and wheel being brought into cooperative relation upon movement of said members relatively in one direction, a cone wheel secured to the shaft between the driving wheel and the adjacent end of the first bearing sleeve, a cone wheel secured to the journal in spaced relation with the cutter disk and adapted to be peripherally engaged by the periphery of the first cone wheel, and a bearing wheel rotatably supported in the frame and having peripheral contact with the journal between the cutter disk and the adjacent cone wheel.

16. A can opener of the rotary drive wheel type comprising two members, coupling means between the members facilitating movement of one member relative to the other, a can rim engaging driving wheel rotatably supported by one member, a cutter disk rotatably supported by the other member in a position to be brought into cooperative working relation with the wheel upon movement of the two members relatively in one direction, a fixed can rest carried by the said one member below the rim engaging driving wheel, a fixed can rest carried by the said other one of the members at one side of the cutter disk, and a spring urged can rest carried by and pivoted to the said other one of the members at the opposite side of the cutter disk from the second mentioned fixed rest for swinging in a plane paralleling the plane of said other one of the members.

17. A can opener of the character stated in claim 16 wherein said resilient rest comprises a pivot rivet secured to the said other one of the members, a plate oscillatably mounted upon the pivot rivet and having a right-angularly directed ear against one side of which the rim of a can engages when the opener is applied to the can, and a spring element supported by the rivet and having one end secured to the adjacent member and the other end bearing against said ear to normally urge oscillation of the plate in one direction.

18. A can opener of the rotary drive wheel type comprising two pivotally coupled body members adapted to have relative movement one with respect to the other, a can rim engaging driving wheel rotatably supported on one member, means for rotating the wheel, a plate pivotally secured to the other member in the vertical plane of the said one member, an ear supported by and in spaced relation with said plate, a journal rotatably supported between the ear and the pivoted plate, a cutter disk carried upon the journal for cooperative working relation with the rim engaging driving wheel when the members are moved relatively in one direction, a fixed can rest carried by the wheel supporting member, below the wheel and projecting laterally from the carrying member, a movable can rest carried by said plate upon one side of the cutter disk, a support carried by said plate upon the opposite side of the cutter from the movable can rest and a resilient element connected between said support and the said other one of the body members for opposing oscillation of the pivoted plate in one direction.

19. A can opener of the character stated in claim 18 wherein the said resilient means connected between the said other one of the body members and the said support comprises a guide sleeve carried by the said other one of the body members between which sleeve and the attached body member an end of the pivoted plate is positioned for limited movement, a cup within the sleeve, the cup opening downwardly toward the said support and the said resilient element comprising a coil spring disposed in the cup and bearing against the said support.

ROBERT E. McLEAN.

References Cited in the file of this patent

UNITED STATES PATENTS

| Number | Name | Date |
|---|---|---|
| 1,008,932 | Walther | Nov. 14, 1911 |
| 1,999,370 | Olschewski | Apr. 30, 1935 |
| 2,287,442 | McLean | June 23, 1942 |
| 2,462,416 | Nelson | Feb. 22, 1949 |
| 2,522,383 | Lampl | Sept. 12, 1950 |